United States Patent [19]

Zupancic

[11] Patent Number: 4,947,699
[45] Date of Patent: * Aug. 14, 1990

[54] WORM REDUCTION GEAR ASSEMBLY

[76] Inventor: Viktor Zupancic, Cesta v Gorica 10/d, YU-61111 Ljubljana, Yugoslavia

[*] Notice: The portion of the term of this patent subsequent to Oct. 4, 2005 has been disclaimed.

[21] Appl. No.: 249,424

[22] Filed: Sep. 23, 1988

Related U.S. Application Data

[63] Continuation-in-part of Ser. No. 905,273, Sep. 8, 1986, Pat. No. 4,774,848.

[30] Foreign Application Priority Data

Sep. 10, 1985 [YU] Yugoslavia .............................. 1418/85

[51] Int. Cl.$^5$ .............................................. F16H 1/16
[52] U.S. Cl. ..................................... 74/425; 74/606 R
[58] Field of Search .................... 74/89.14, 425, 606 R

[56] References Cited

U.S. PATENT DOCUMENTS 4,802,374  2/1989  Hamelin et al. ...................... 74/425

FOREIGN PATENT DOCUMENTS 1568648  5/1969  France ................................. 74/425
61-211558  9/1986  Japan ................................. 74/425
7054  of 1907  United Kingdom ................... 74/425

*Primary Examiner*—Leslie A. Braun
*Assistant Examiner*—Scott Anchell
*Attorney, Agent, or Firm*—Herbert Dubno

[57] ABSTRACT

A worm reduction gear assembly has a casing or housing composed of two tube parts and three flanges on ends of the tube parts. The worm wheel is journaled between bearings in one tube and meshes with a worm in the other tube. The bearings are received in centering bushes which are sealed by seals in grooves formed in the respective tube. A supporting connecting can be provided on the casing or housing for a steering wheel preferably along the center of the worm wheel and worm and perpendicular to the axes of the worm and worm wheel shaft.

9 Claims, 3 Drawing Sheets

WORM REDUCTION GEAR ASSEMBLY

CROSS REFERENCE TO RELATED APPLICATION

This application is a continuation-in-part of my copending application Ser. No. 06/905,273 filed Sept. 8, 1986 and now U.S. Pat. No. 4,774,848.

FIELD OF THE INVENTION

My present invention relates to worm-reduction gearing, and more particularly, to a worm reduction gear assembly which can be used in a variety of applications and mounted with high versatility in various configurations with motors, driving elements and driven elements. In particular, the invention relates to a worm reduction gear assembly which can be used in steering applications.

BACKGROUND OF THE INVENTION

A worm reduction gear generally comprises a worm shaft carrying a worm and lying orthogonal to a worm-wheel shaft on which a worm wheel is keyed to mesh with the worm. Both shafts are journaled in a housing which is usually specially designed for the particular application to which the reduction gearing is to be put.

Such systems lack versatility, generally make use of expensive housing structures and are largely unsatisfactory for other reasons as well.

OBJECTS OF THE INVENTION

It is the principal object of the present invention to provide an improved worm reduction gear with greater versatility.

Another object of the invention is to provide a worm reduction gear which can be fabricated at low cost and can be readily adapted to a wide variety of applications.

It is also an object of this invention to provide an improved worm reduction gear assembly which extends the principles set forth in my earlier application.

SUMMARY OF THE INVENTION

These objects and others which will become apparent hereinafter are achieved in accordance with the invention, by providing a worm reduction gear assembly which comprises:

a housing formed with:
  a first generally cylindrical tube having a first axis and opposite open axial ends,
  a second generally cylindrical tube connected laterally to the first tube and having a second axis orthogonal to the axis of the first tube and offset therefrom in a direction perpendicular to both of the axes, the second tube being open axially at least at one of the ends of the second tube, and
  respective circular flanges formed on each of the open ends and lying in respective planes perpendicular to the axes;
a worm wheel shaft extending along the first axis and rotatable therearound;
a worm wheel keyed to the worm wheel shaft in the first tube intermediate the ends thereof;
a worm shaft extending along the second axis and rotatable therearound in the second tube;
a worm keyed to the worm shaft in the second tube between the ends thereof and meshing with the worm wheel;
centering bushes received in the first tube flanking the worm wheel;
respective first bearings interposed between the worm wheel shaft and the bushes for journaling the worm wheel shaft in the first tube, the first tube being formed with inwardly open grooves opening toward the bushes;
circular seals in the grooves sealing between the bushes and the first tube;
respective second bearings in the second tube flanking the worm and journaling the worm shaft in the second tube; and
a shaft stub formed on the housing substantially perpendicular to both of the axes.

According to a feature of the invention, the second tube is provided with pair of bearings spaced apart by the worm shaft and an end of the second tube which is not provided with a flange is capped.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
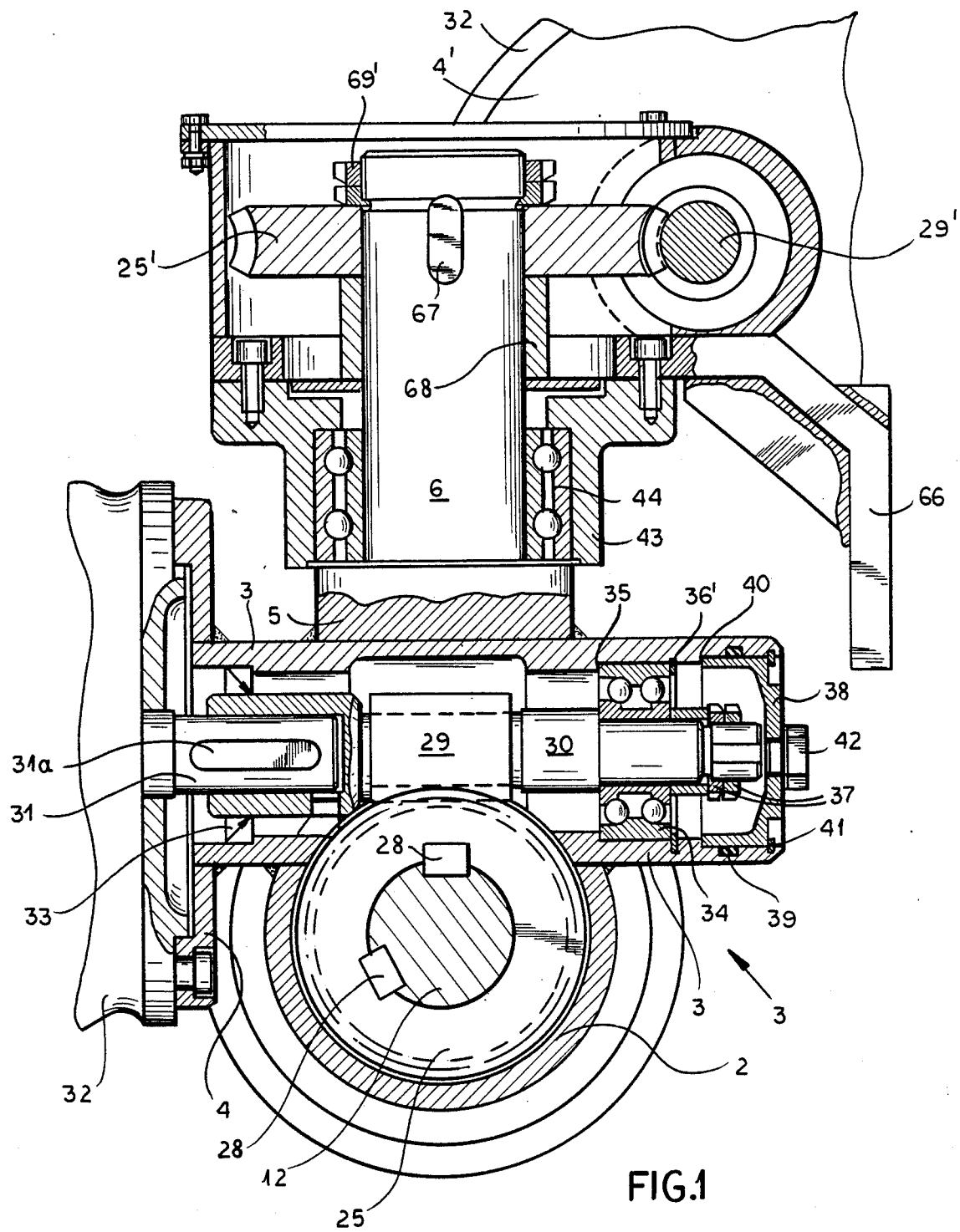
FIG. 1 is a vertical sectional view through a worm reduction gear in accordance with the principles of this invention.

FIG. 1 illustrates a worm reduction gear in accordance with the invention which comprises a casing 1 consisting of a tube 2 and a tube 3. The tube 2 is, of course, the first tube of the present invention while the tube 3 is the second tube thereof. A flange 4 can be welded onto the second tube 3 (FIG. 1) or can be integral therewith (FIGS. 1A and 2) and a supporting connection 5 is shown to be welded onto the second tube 2 in FIG. 1 and to be integral with this tube in FIG. 1A to enable a steering element, such as a steering wheel, to be coupled to the housing for rotating it about an axis perpendicular to the axes of the tubes which themselves are orthogonal to one another.

Figure 1A:
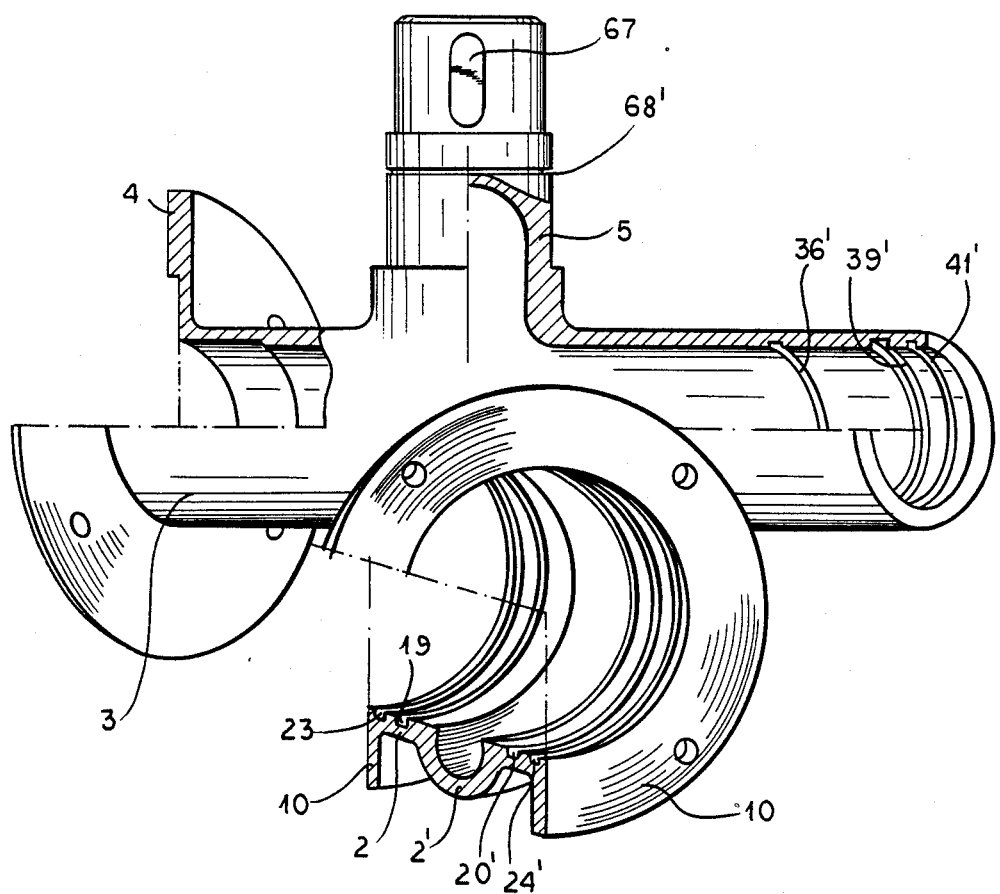
FIG. 1A is a perspective view of the housing structure of this assembly.

In particular in FIG. 1, the connection 5 is shown to extend upwardly into a shaft 6 which is keyed at 67 to a worm gear 25' meshing with a worm wheel 29 of a further assembly provided with a flange at 4' and driven by means shown at 32 so that the entire casing 1 can be rotated about the vertical axis. The shaft 6 formed by the connection 5 is here journaled in a double-row ball-bearing 44 of a housing 43. A spacer 68 can be provided on the shaft 6 as shown in FIG. 1A. Locking nuts 69' secure the worm wheel 25' in place.

Within the casing 1 is a shaft 12, hereinafter referred to as the worm-wheel shaft, a shaft 30 referred to as the worm shaft and pairs of bearings which will be described in greater detail hereinafter.

Figure 3:
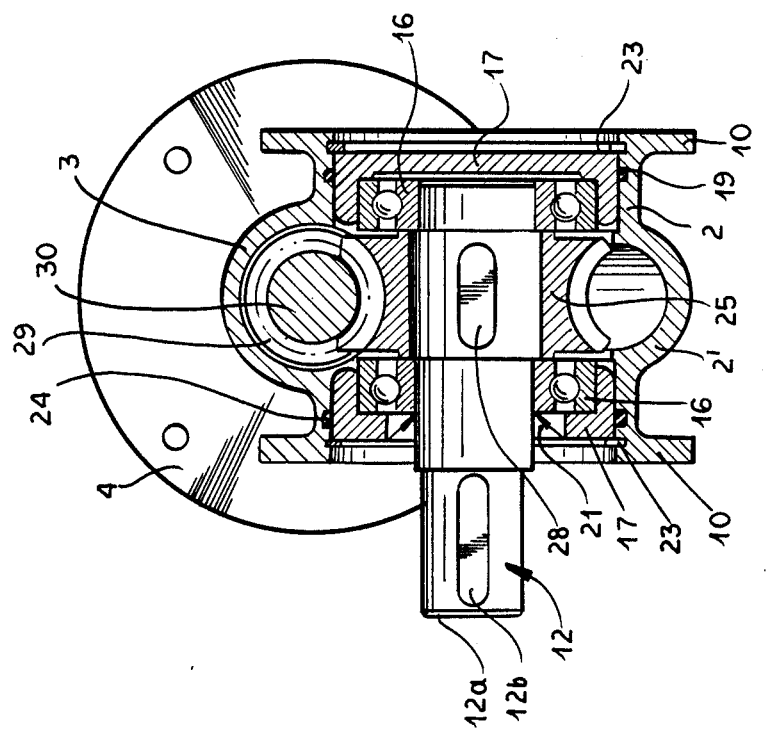
FIG. 3 is a cross sectional view taken along the line III—III of FIG. 2.

Referring now to FIG. 3 which shows the construction of the worm-wheel assembly in greater detail, it will be seen that a worm wheel 25 is connected (keyed) to the shaft 12 by keys 28 and is flanked by bearings 16 received in centering bushes 17, the latter being sealed in the tube 2 by sealing rings 24 lodged in inwardly open grooves 19 formed in the tube 2. An annular bulge 2' is formed in the tube 2 around the worm wheel 25.

The centering bushes 17 are held in place by C clips 23 (FIG. 3), i.e. internal spring rings or Seeger rings.

The worm wheel 25 (FIGS. 1 and 3) meshes with the worm 29 which can be formed unitarily on the worm shaft 30. A drive shaft 31 of an electric motor 32, for example, bolted to the flange 4, may be keyed to the shaft 30 by the key 31a (FIG. 1).

The tube 2 is formed at each of its axially oppositely open ends with a respective flange 10 to which a load unit can be bolted for connection to the stub 12a (FIG. 3) of the worm-wheel shaft by a key 12b. It will be understood that the load unit can be bolted to either flange 10 and that the entire worm-wheel shaft assembly can be reversed in the tube 2 so that the stub 12a will project from the opposite axial end and the load will be bolted to the opposite flange 10.

Turning again to FIG. 1 and 2, it can be seen that the shaft 30 is journaled in the second tube 3 by at least one bearing 34 although preferably two such bearings are provided, the second bearing being represented at 33' in FIG. 2. Seals 33 can seal the axial end of the tube formed with the flange 4 around the shaft.

Figure 2:
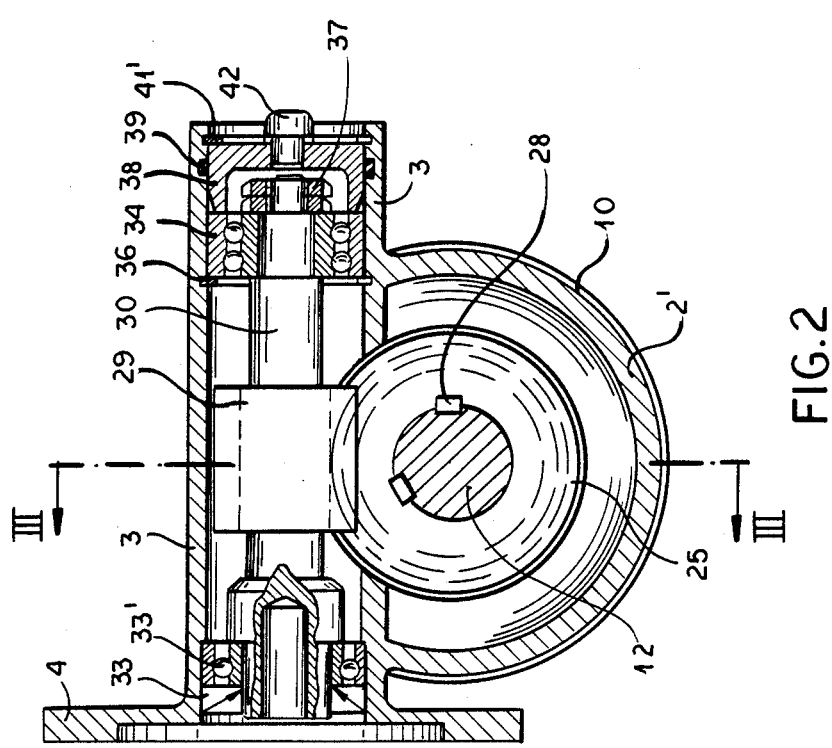
FIG. 2 is a cross sectional view through another worm reduction gear in accordance with the invention.

The axial bearing 34 is located between a seat 35 formed by a shoulder in FIG. 1 and by a Seeger ring 36 in FIG. 2 and another Seeger ring 36' (FIG. 1) or the end of the cap 38 or cover which is held in place, in turn, by a Seeger ring 41 (FIG. 1) or 41' (FIG. 2). A plug bolt 42 FIGS. 1 and 2) can be removed to permit filling of the casing with oil. Around the cover or cap 38, a seal 39 is provided in an annular inwardly open groove formed in the tube 3. The bolt 42 can also serve to cooperate with a cover remover.

In FIG. 1, the cover can engage a shoulder or seat 40 formed in the housing.

A pair of bearing nuts 37 may hold the inner race of the bearing 34 in place axially on the shaft 30.

It will be apparent that the worm reduction gearing of FIGS. 1 and 1A, provided with a formation 5 to which a mechanism for rotating the casing can be connected and the worm reduction gearing of FIGS. 2 and 3 which are not provided with this additional formation have extremely high versatility.

I claim:

1. A worm reduction gear assembly, comprising:
  a housing formed with:
    a first generally cylindrical tube having a first axis and opposite open axial ends,
    a second generally cylindrical tube connected laterally to said first tube and having a second axis orthogonal to the axis of said first tube and offset therefrom in a direction perpendicular to both of said axes, said second tube being open axially at least at one of the ends of said second tube, and
    respective circular flanges formed on each of said open ends and lying in respective planes perpendicular to said axes;
  a worm wheel shaft extending along said first axis and rotatable therearound;
  a worm wheel keyed to said worm wheel shaft in said first tube intermediate the ends thereof;
  a worm shaft extending along said second axis and rotatable therearound in said second tube;
  a worm keyed to said worm shaft in said second tube between the ends thereof and meshing with said worm wheel;
  centering bushes received in said first tube flanking said worm wheel;
  respective first bearings interposed between said worm wheel shaft and said bushes for journaling said worm wheel shaft in said first tube, said first tube being formed with inwardly open grooves opening toward said bushes;
  circular seals in said grooves sealing between said bushes and said first tube;
  respective second bearings in said second tube flanking said worm and journaling said worm shaft in said second tube; and
  a shaft stub formed on said housing substantially perpendicular to both of said axes.

2. A worm reduction gear assembly, comprising:
  a housing formed with:
    a first generally cylindrical tube having a first axis and opposite open axial ends,
    a second generally cylindrical tube connected laterally to said first tube and having a second axis orthogonal to the axis of said first tube and offset therefrom in a direction perpendicular to both of said axes, said second tube being open axially at least at one of the ends of said second tube, and
    respective circular flanges formed on each of said open ends and lying in respective planes perpendicular to said axes;
  a worm wheel shaft extending along said first axis and rotatable therearound;
  a worm wheel keyed to said worm wheel shaft in said first tube intermediate the ends thereof;
  a worm shaft extending along said second axis and rotatable therearound in said second tube;
  a worm keyed to said worm shaft in said second tube between the ends thereof and meshing with said worm wheel;
  centering bushes received in said first tube flanking said worm wheel;
  respective first bearings interposed between said worm wheel shaft and said bushes for journaling said worm wheel shaft in said first tube, said first tube being formed with inwardly open grooves opening toward said bushes;
  circular seals in said grooves sealing between said bushes and said first tube; and
  a second bearing in said second tube journaling said worm shaft in said second tube.

3. The worm reduction gearing defined in claim 2 wherein said second bearing is provided at one side of said worm and a shaft seal is provided on an opposite side of said worm to seal said second tube against said worm shaft.

4. The worm reduction gearing defined in claim 2 wherein said second bearing is one of a pair of bearings in said second tube flanking said worm.

5. The worm reduction gearing defined in claim 2 wherein at least one of said flanges is welded to the respective end of the respective tube.

6. The worm reduction gearing defined in claim 2 wherein said second tube is formed with an opposite end receiving a cap and provided with a threaded plug for filling said housing with oil.

7. The worm reduction gearing defined in claim 2 wherein said tubes and said flanges are formed in one piece.

8. The worm reduction gearing defined in claim 2 wherein said tubes are formed in one piece.

9. The worm reduction gearing defined in claim 2 wherein said tubes are welded together.

* * * * *